United States Patent
Chertok et al.

(10) Patent No.: US 8,731,306 B2
(45) Date of Patent: May 20, 2014

(54) INCREASING INTEREST POINT COVERAGE IN AN IMAGE

(75) Inventors: Michael Chertok, Petah-Tikva (IL); Adi Pinhas, Hod Hasharon (IL)

(73) Assignee: Superfish Ltd., Givat Shmuel (IL)

( * ) Notice: Subject to any disclaimer, the term of this patent is extended or adjusted under 35 U.S.C. 154(b) by 667 days.

(21) Appl. No.: 13/054,557

(22) PCT Filed: Jul. 27, 2009

(86) PCT No.: PCT/IL2009/000731
§ 371 (c)(1),
(2), (4) Date: Jul. 21, 2011

(87) PCT Pub. No.: WO2010/013236
PCT Pub. Date: Feb. 4, 2010

(65) Prior Publication Data
US 2011/0317922 A1    Dec. 29, 2011

Related U.S. Application Data

(60) Provisional application No. 61/084,444, filed on Jul. 29, 2008.

(51) Int. Cl.
*G06K 9/32*    (2006.01)
*G09G 5/00*    (2006.01)

(52) U.S. Cl.
USPC ............................ 382/201; 382/298; 345/660

(58) Field of Classification Search
USPC ......... 382/128, 180, 201, 103, 132, 141, 106, 382/144, 298, 299, 300; 345/660, 522, 501
See application file for complete search history.

(56) References Cited

U.S. PATENT DOCUMENTS

| | | |
|---|---|---|
| 6,711,293 B1 | 3/2004 | Lowe |
| 6,917,827 B2 | 7/2005 | Kienzle, III |
| 7,302,348 B2 | 11/2007 | Ghosh et al. |
| 2008/0107307 A1 | 5/2008 | Altherr |

OTHER PUBLICATIONS

Basher et al. "A new texture representation approach based on local feature saliency." Pattern Recognition Image I Analysis, Allen Press Lawrence. vol. 17. No. 1. 2007. pp. 11-24.*
International Search Report for International Application No. PCT/IL2009/000731 mailed Nov. 25, 2009.
Basher et al. "A new texture representation approach based on local feature saliency." *Pattern Recognition Image Analysis, Allen Press Lawrence*. vol. 17. No. 1. 2007. pp. 11-24.
Jong et al. "Raising Local Density for Object Reconstruction using Auxiliary Points." *IEEE*. 2006. pp. 265-270.

* cited by examiner

*Primary Examiner* — Sheela Chawan
(74) *Attorney, Agent, or Firm* — Merchant & Gould P.C.

(57) ABSTRACT

A system for generating virtual interest points in an image, according to detected interest points in that image is detected by an interest point detector. The system includes: an interest point density map producer and an interest point generator, the interest point density map producer receiving the image including the detected interest points, the interest point density map producer extracts a density map of the detected interest points within the image. The interest point generator is coupled with the interest point density map producer, the interest point generator receiving the image including the detected interest points and the interest point density map. The interest point generator determines image areas for generating virtual interest points, the interest point generator generating at least one virtual interest point at the determined areas according to at least the position of one of the detected interest points, the virtual interest point not being detected by the interest point detector.

13 Claims, 4 Drawing Sheets

INCREASING INTEREST POINT COVERAGE IN AN IMAGE

This application is a National Stage Application of PCT/IL2009/000731, filed 27 Jul. 2009, which claims benefit of U.S. Ser. No. 61/084,444, filed 29 Jul. 2008 and which applications are incorporated herein by reference. To the extent appropriate, a claim of priority is made to each of the above disclosed applications.

FIELD OF THE DISCLOSED TECHNIQUE

The disclosed technique relates to interest point detectors, in general, and to methods and systems for increasing the coverage of interest points, in an area in an image where the coverage of interest points in insufficient, in particular.

BACKGROUND OF THE DISCLOSED TECHNIQUE

An interest point is a point in an image which is characterized as follows. An interest point has a clear and a well-defined position in an image space. An interest point has a high degree of repeatability (i.e., an interest point is likely to be detected in two images of an object, even though the images were taken in different conditions, such as by different cameras, resolutions, lighting conditions, and shooting angles). Interest points are employed for example, for image matching, object recognition, object categories in two dimensional images, three dimensional reconstruction, motion tracking and segmentation, robot localization, image panorama stitching and epipolar calibration. Interest point detectors are known in the art, and different detectors detect different features (i.e., Interest points) in an image.

U.S. Pat. No. 6,711,293 issued to Lowe, and entitled "Method and Apparatus for Identifying Scale Invariant Features in an Image and Use of Same for Locating an Object in an Image", is directed to a method for identifying scale invariant features in an image. The method includes the procedures of producing a plurality of difference images, for each difference image locating a pixel amplitude extremum, for each amplitude extremum defining a pixel region around the amplitude extremum, for each pixel region dividing the pixel region into sub-regions, and for each sub-region producing a plurality of component descriptors.

The procedure of producing difference images involves successively blurring an input image to produce a blurred image, and subtracting the blurred image from an initial image, to produce the difference image. The collective set of component sub-region descriptors of each sub-region of the pixel amplitude extremum of a difference image, represents the scale invariant features of the original image.

U.S. Pat. No. 6,917,827 issued to Kienzle, and entitled "Enhanced Graphic Features for Computer Assisted Surgery System", is directed to a system for inserting multiple guide pins into a bone. The system includes a probe, which has a graphic representation that includes a real probe tip portion and a virtual probe tip portion. The real probe tip portion of the representation correlates directly with the position of the real probe tip. The virtual probe tip portion of the representation correlates with a point in space that is located at a fixed and known relationship to the physical probe tip. In other words, whenever the physical probe is represented in an image, the virtual probe tip is also represented in that image. The location of the virtual tip probe within the image is determined according to the location of the probe representation. A surgeon positions the virtual probe representation on a bony landmark, in the body of a patient, in an x-ray image, for recording and calculating the position of the bony landmark.

U.S. Pat. No. 7,302,348 issued to Ghosh et al., and entitled "Method and System for Quantifying and Removing Spatial-Intensity Trends in Microarray Data", is directed to a method for quantifying and correcting spatial-intensity trends in a microarray data. The method includes the procedure of employing a moving-window filter for selecting highest-signal-intensity features. In order to avoid overlooking features near the edge of the microarray boundary during moving-window filtering, the microarray features are extended symmetrically near the boundaries. The size of the symmetric extensions (i.e., of the near-boundary features) are determined by the size of the moving-window filter.

SUMMARY OF THE DISCLOSED TECHNIQUE

It is an object of the disclosed technique to provide a novel method and system for generating a virtual interest point, which overcomes the disadvantages of the prior art. In accordance with the disclosed technique, there is thus provided a system for generating virtual interest points in an image, according to detected interest points in that image, detected by an interest point detector. The system includes an interest point density map producer and an interest point generator. The interest point generator is coupled with the interest point density map producer. The interest point density map producer receives the image including the detected interest points. The interest point density map producer produces a density map of the detected interest points within the image. The interest point generator receives the image including the detected interest points and the interest point density map. The interest point generator determines image areas for generating virtual interest points. The interest point generator generates at least one virtual interest point, at the determined areas, according to at least the position of one of the detected interest points.

In accordance with another embodiment of the disclosed technique, there is thus provide a method for generating virtual interest points in an image, according to detected interest points in that image, the method includes the procedures of producing an interest point density map of the image, determining image areas for generating virtual interest points, and generating at least one virtual interest point. The procedure of determining image areas for generating virtual interest points is performed according to the interest point density map. The at least one virtual interest point is generated at the determined image areas, at a position determined according to the characteristics of at least one of the detected interest points.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by generating additional interest points (i.e., virtual interest points) in an image, according to the interest points detected by an interest point detector (i.e., detected interest points). The virtual interest points are generated based on the detected interest points (i.e., interest points relating to a feature in the image). The detected interest points are detected by an interest point detector as known in the art (e.g., canny—edge detection, Harris—corner detection, Laplacian of Gaussian—blob detection, Hessian—Affine invariant feature detection, scale invariant feature transform—feature detection, and the like). The production of virtual interest points enables employing interest points in image areas where the quantity and spread of image features (which can be detected and marked as interest points) are not sufficient.

The repeatability of the virtual interest point is substantially similar to that of the detected interest point. In other words, the virtual point is based on the detected point, such that when the detected point appears in an image, the corresponding virtual point is positioned in that image according to the position and according to other characteristics of the detected point.

The virtual interest points are employed in a similar manner to the detected interest points and enable a better description of the image. A local image patch around each of the detected interest points (i.e., the portion of the image surrounding the interest point), is described by a local descriptor (e.g., Shape-context, Scale-Invariant Feature Transform—SIFT, Speeded Up Robust Features—SURF, Gradient Location and Orientation Histogram GLOH, Local Energy based Shape Histogram—LESH). The description quality of an image, and the quality of an image processing procedure, such as object recognition, and the like, are a direct function of the quantity and the coverage (i.e., spread) of the interest points within the image.

Figure 1A:
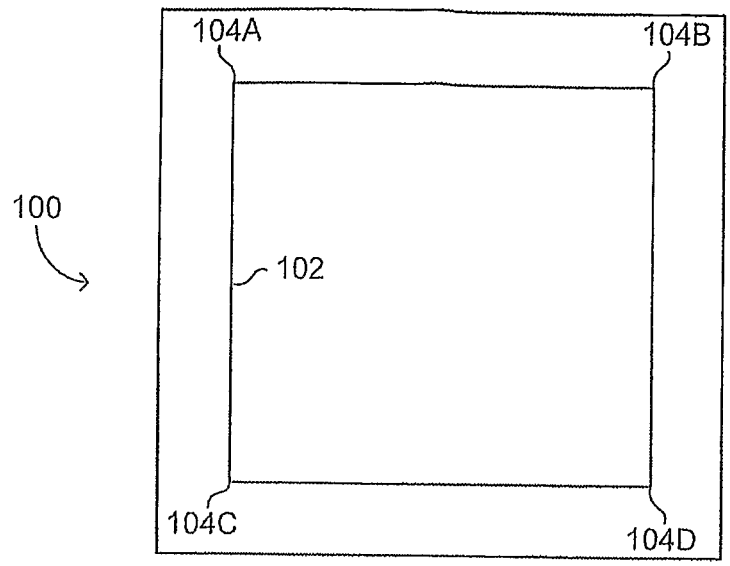
FIG. 1A is a schematic illustration of an image of a rectangle, constructed in accordance with an embodiment of the disclosed technique.
Figure 1B:
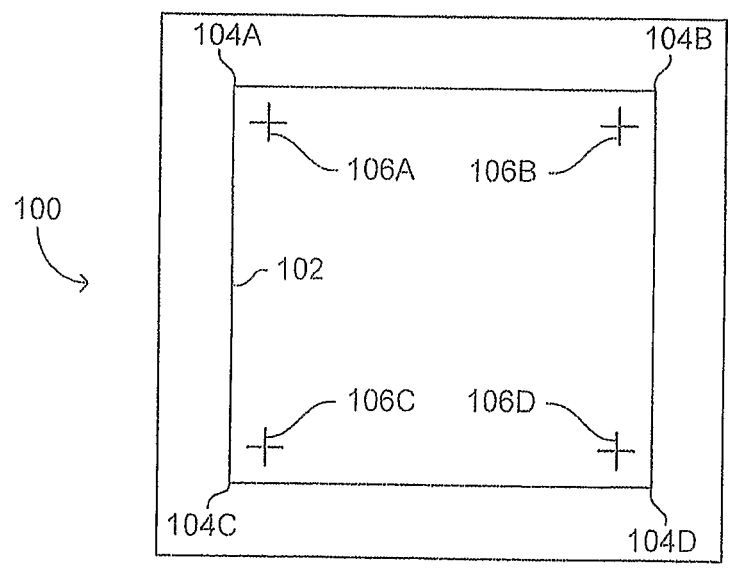
FIG. 1B is a schematic illustration of the image of FIG. 1A with four detected interest points.
Figure 1C:
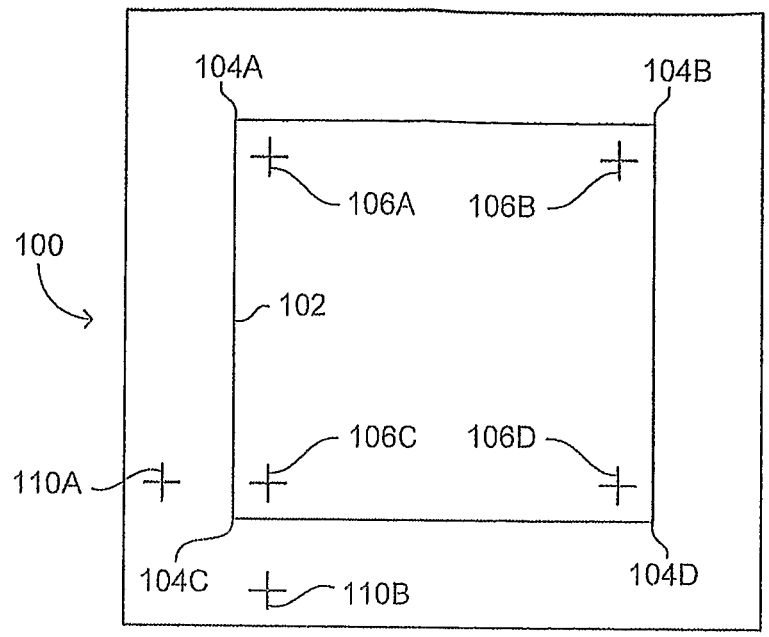
FIG. 1C is a schematic illustration of the image of FIG. 1B with two additional virtual interest points.
Figure 1D:
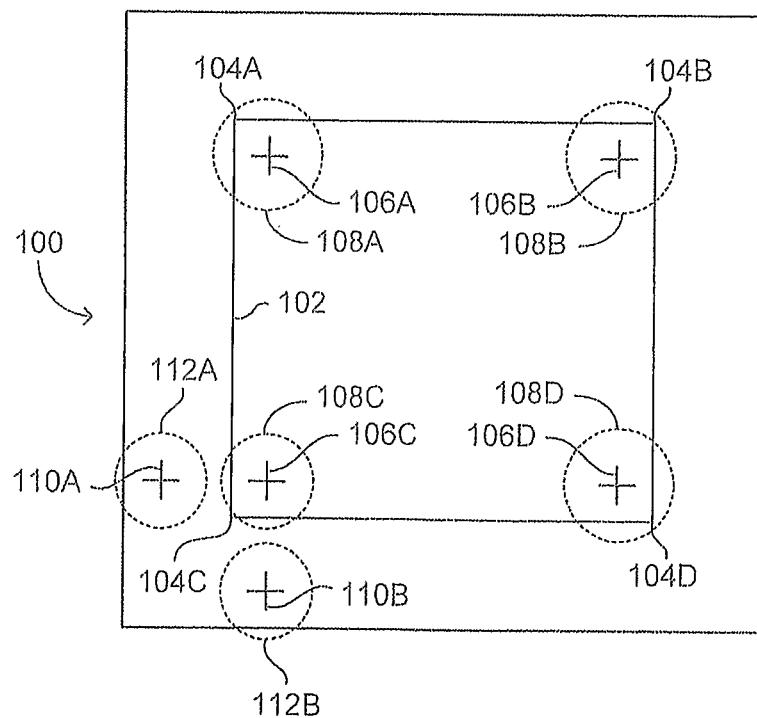
FIG. 1D is a schematic illustration of the image of FIG. 1C with a local image patch surrounding each of the interest points (i.e., both virtual and detected interest points)

Reference is now made to FIGS. 1A, 1B, 1C and 1D. FIG. 1A is a schematic illustration of an image of a rectangle, generally referenced 100, constructed in accordance with an embodiment of the disclosed technique. FIG. 1B is a schematic illustration of the image of FIG. 1A with four detected interest points. FIG. 1C is a schematic illustration of the image of FIG. 1B with two additional virtual interest points. FIG. 1D is a schematic illustration of the image of FIG. 1C with a local image patch surrounding each of the interest points (i.e., both virtual and detected interest points).

With reference to FIG. 1A, image 100 includes a rectangle 102. Rectangle 102 includes four corners, a top left corner 104A, a top right corner 104B, a bottom left corner 104C, and a bottom right corner 104D. An Interest Point detector (e.g., Harris corner detector), as known in the art, detects the four corners 104A, 104B, 104C, and 104D, and marks them as four interest points.

With reference to FIG. 1B, image 100 further includes four detected interest point markers 106A, 106B, 106C and 106D, related to corners 104A, 104B, 104C and 104D, respectively. A detected interest point is an interest point which is related to an actual feature in an image (e.g., detected interest point marker 106C is related to rectangle corner 104C). It is noted, that all of detected interest point markers 106A, 106B, 106C and 106D are located within rectangle 102 (i.e., no interest point is detected outside rectangle 102 of image 100).

With reference to FIG. 1C, image 100 further includes two virtual interest point markers, a left virtual interest point marker 110A and a bottom virtual interest point marker 110B. Virtual interest point markers 110A and 110B are generated according to detected interest point marker 106C, and are independent of an interest point detector (not shown), which is employed for detecting detected interest point marker 106C. A position of each of virtual interest point markers 110A and 110B, is determined according to a plurality of characteristics of detected interest point marker 106C, such as a position of detected interest point marker 106C, a local dominant orientation of detected interest point marker 106C, a local scale value of detected interest point marker 106C, and the like.

The position of each of virtual interest point markers 110A and 110B, can further be determined according to features of image 100. For example, the position of virtual interest point 110A is determined according to the position of detected interest point 106C and the distance from interest point 106C to the nearest edge (i.e., the left border of rectangle 102), such that virtual interest point 110A is mirroring detected interest point 106O across the left border of rectangle 102.

With reference to FIG. 1D, four local image-patches 108A, 108B, 108C, and 108D, are positioned around each of detected interest point markers 106A, 106B, 106C and 106D, respectively. When the interest point detector detects an interest point, it determines the position coordinates (i.e., X, Y) of that interest point. The interest point detector further determines the local scale value of the interest point. In order to find the local scale value, the detector attempts to maximize the energy of a certain function (e.g., determinant of Hessian) over different scales. In the example set forth in FIG. 1B, local image patches 108A, 108B, 108C and 108D are circular. Alternatively, a local image patch can be any other shape, such as an ellipse, a rectangle, and the like. In the example set forth in FIG. 1B, the local image patch size is related to the natural-scale.

A local descriptor (e.g., Shape-context, SIFT, SURF, GLOH, LESH) is extracted for each of local image patches 108A, 108B, 108C, and 108D. Each of detected interest point markers 106A, 106B, 106C and 106D, is associated with a plurality of descriptor characteristics, such as interest point coordinates (i.e., the location of detected interest point marker 106A within image 100), a local dominant orientation (i.e., In a patch within an image, there is frequently at least one edge. The patch dominant orientation is determined according to the strongest edge in a local image patch), a natural scale value, and the like. Image patches 112A and 112B, are defined respective of a predetermined region (i.e., local image patch) about virtual interest points 110A and 110B, respectively. A local descriptor is extracted from each of image-patches 112A and 112B.

Figure 2:
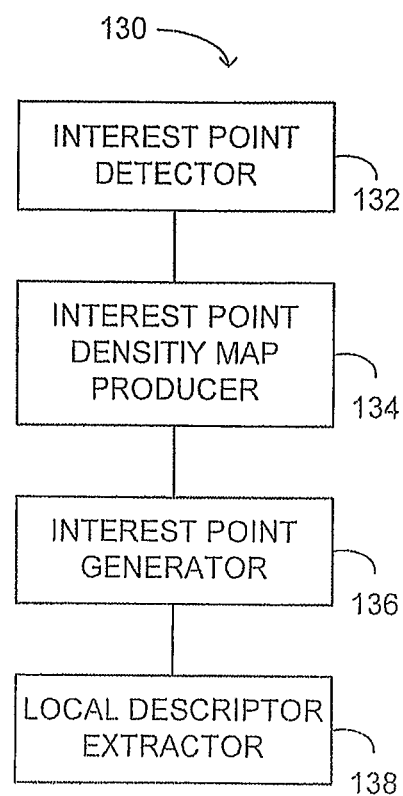
FIG. 2, is a schematic illustration of a system for generating a plurality of virtual interest points according to respective ones of detected interest point markers, constructed and operative in accordance with another embodiment of the disclosed technique.

Reference is now made to FIG. 2, which is a schematic illustration of a system, generally referenced 130, for generating a plurality of virtual interest points according to respective ones of detected interest point markers, constructed and operative in accordance with another embodiment of the disclosed technique. System 130 includes an interest point detector 132, an interest point density map producer 134, an interest point generator 136, and a local descriptor extractor 138. Interest point density map producer 134 is coupled with interest point detector 132 and with interest point generator 136. Interest point generator 136 is further coupled with local descriptor extractor 138.

Interest point detector 132 can be any interest point detector known in the art. For example, a Canny detector (i.e., edge detection), a Harris detector (i.e., corner detection), a Laplacian of Gaussian detector (i.e., blob detection), a Hessian detector (i.e., Affine invariant feature detection), a scale invariant feature transform detector (i.e., SIFT—feature detection), and the like. Interest point detector 132 detects a plurality of interest points in an image (e.g., image 100 of FIG. 1).

Interest point density map producer 134 produces a plurality of interest point density maps. Interest point density map producer 134 further analyzes each of the interest point density maps, and determines interest point densities, respective of different image portions. Interest point density map producer 136 provides the interest point density maps to interest point generator 138.

One example of a method of operation of Interest point density map producer 134 is by counting the number of detected interest points in a predetermined area surrounding a pixel, for each of the pixels of the image. When the counted number of interest points is lower than a predetermined value, a virtual interest point is generated in that area. Another example of a method of operation of Interest point density map producer 134 is measuring the distance from an interest point to the five nearest interest points. When the value of the distance is larger than a predetermined value, a virtual interest point is generated according to that interest point (the interest point the distance was measured relative thereto).

Interest point generator 136 determines image area for generating virtual interest points according to the interest point density maps. Interest point generator 136 generates a virtual interest point (e.g., bottom virtual interest point 110B of FIG. 1C) in a position corresponding to the characteristics of a respective detected interest point marker (e.g., interest point 106C of FIG. 1B). The characteristics of the detected interest point, upon which the position of the virtual interest point is determined, are for example, position, local dominant orientation, local scale value, and the like. It is noted that, a virtual interest point can inherit some of the characteristics of the parent interest point (i.e., the interest point according to which it was generated), such as local scale value, and the like.

Local descriptor extractor 138 can be any local descriptor extractor known in the art. Local descriptor extractor 138 extracts a descriptor corresponding to each local image patch (e.g., a descriptor of an image patch 108A respective of detected interest point marker 106A of FIG. 1) around each detected interest point marker, as detected by interest point detector 132, and around each virtual interest point, as generated by interest point generator 134.

It is noted, that interest point detector 132, interest point density map producer 134, interest point generator 136, and local descriptor extractor 138 can be associated with the same processor (not shown). Alternatively, at least one of interest point detector 132, interest point density map producer 134, interest point generator 136, and local descriptor extractor 138 can be associated with a respective processor, wherein the processors are located remote from one another, and communicate via a communication link.

Figure 3:
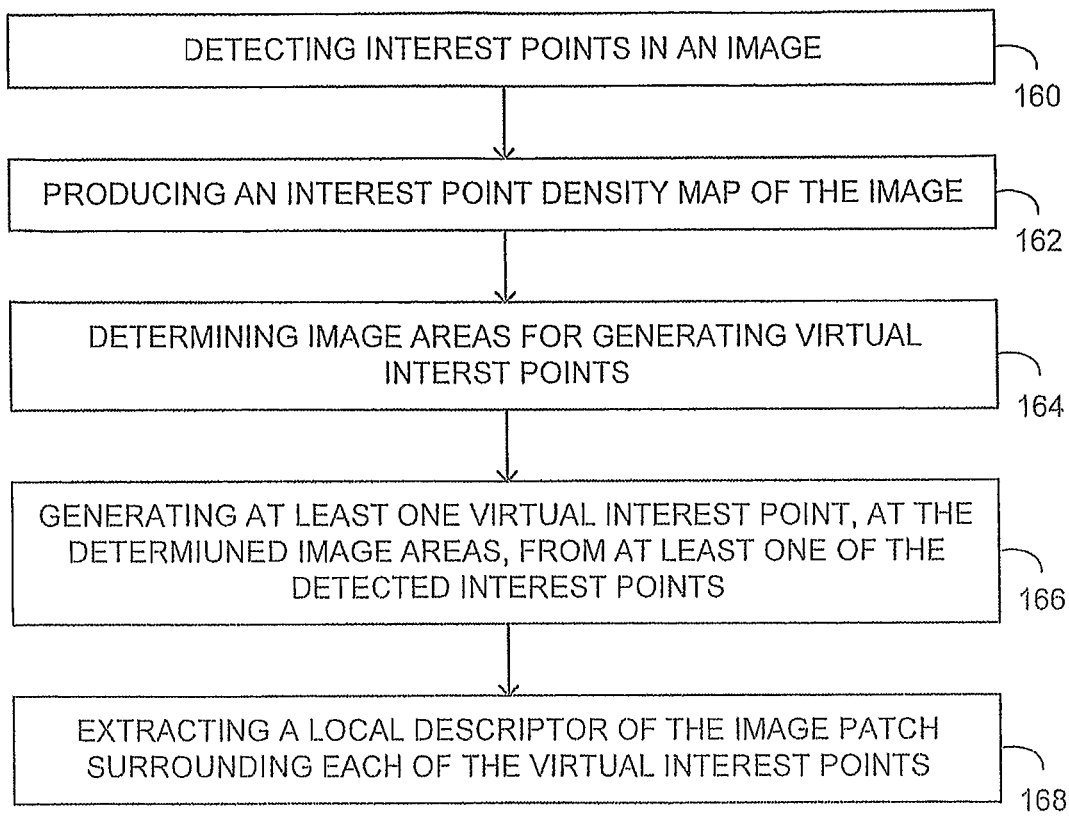
FIG. 3, which is a schematic illustration of a method for operating the system of FIG. 2, operative in accordance with a further embodiment of the disclosed technique.

Reference is now made to FIG. 3, which is a schematic illustration of a method for operating the system of FIG. 2, operative in accordance with a further embodiment of the disclosed technique. In procedure 160, an interest point is detected. With reference to FIGS. 2 and 1B, interest point detector 132 receives image 100. Interest point detector 132 detects detected interest point markers 106A, 106B, 106C, and 106D.

In procedure 162, an interest point density map of the image is produced. With reference to FIGS. 2 and 1B, interest point density map producer 134 produces an interest point density map of image 100. In procedure 164, image areas for generating virtual interest points are determined according to the interest point density map. It is noted that, virtual interest points can be generated randomly, at uniform positions across the image (e.g., every 10 pixels), and the like. With reference to FIGS. 2 and 1C, interest point generator 136 determines that virtual interest points are to be generated at the bottom left corner of image 100 according to the interest point density map.

In procedure 166, at least one virtual interest point is generated, at the determined image areas (i.e., determined at procedure 166), according to the characteristics of the respective detected interest point marker. With reference to FIGS. 2 and 1C, interest point generator 136 receives data respective of the interest point density maps, from interest point density map producer 134. Interest point generator 136 generates virtual interest points 110A and 110B according to detected interest point marker 106C.

For example, according to a position of detected interest point marker 106C, the dominant orientation of detected interest point marker 106C, and the local scale value of detected interest point marker 106C. If a local dominant orientation of detected interest point marker 106C is directed to the left of image 102, and a scale value of detected interest point marker 106C is equal to five, then interest point generator 138 generates virtual interest point 110A, located five pixels to the left of detected interest point marker 106C.

Alternatively, Interest point generator 136 generates virtual interest points 110A and 110B according to detected interest point marker 106C and according to the features of image 100. For example, Interest point generator 138 generates virtual interest point 110A beyond the left side of rectangle 102, such that virtual interest point 110A mirrors detected interest point 106C beyond the left side of rectangle 102. Interest point generator 138 generates virtual interest point 110B beyond the bottom side of rectangle 102, such that virtual interest point 110B mirrors detected interest point 106C beyond the bottom side of rectangle 102.

In procedure 168, a local descriptor of the image patch surrounding each of the interest points is extracted. With reference to FIGS. 2 and 1D, local descriptor extractor 138 extracts a local descriptor of image patches 108A, 108B, 108C, 108D, 112A and 112B surrounding interest points 106A, 106B, 106C, 106D, 110A and 110B, respectively.

It will be appreciated by persons skilled in the art that the disclosed technique is not limited to what has been particularly shown and described hereinabove. Rather the scope of the disclosed technique is defined only by the claims, which follow.

The invention claimed is:

1. System for generating virtual interest points in an image, according to detected interest points in that image, detected by an interest point detector, the system comprising:

an interest point density map producer, said interest point density map producer receiving said image including said detected interest points, said interest point density map producer produces a density map of said detected interest points within said image;

an interest point generator coupled with said interest point density map producer, said interest point generator receiving said image including said detected interest points and said interest point density map, said interest point generator determining image areas for generating virtual interest points, said interest point generator generating at least one virtual interest point, at said determined areas, according to at least the position of one of said detected interest points, said virtual interest point was not detected by said interest point detector;

wherein each of said detected interest points and each of said at least one virtual interest point has a well-defined position in an image space of said image.

2. The system of claim 1, wherein said interest point density map producer produces said density map according to the number of said detected interest points positioned in a predetermined area surrounding each of the pixels of said image.

3. The system of claim 1, wherein said interest point density map producer produces said density map according to the distance between each of said detected interest points and five of said detected interest points, which are positioned nearest to said detected interest point.

4. The system of claim 1, wherein said interest point generator produces said virtual interest point in a position which is determined further according to at least one of the list consisting of: the position of at least one of said detected interest points; the local dominant orientation of at least one of said detected interest points; the local scale value of at least one of said detected interest points; and features of said image.

5. The system of claim 1, wherein said interest point generator determines the characteristics of each of said virtual interest points according to at least the characteristics of at least one of said detected interest points.

6. The system of claim 1, further comprising a local descriptor extractor extracting a local descriptor corresponding to each of said detected interest points and a local descriptor corresponding to each of said virtual interest points.

7. Method for generating virtual interest points in an image, according to detected interest points in that image, the method comprising the procedures of:

producing an interest point density map of said image by an interest point density map producer by a first processor;

determining image areas for generating virtual interest points by an interest point generator implemented by a second processor, said interest point generator determining said image areas according to said interest point density map; and generating by said interest point generator at least one virtual interest point, at said determined image areas, at a position determined according to the characteristics of at least one of said detected interest points;

wherein each of said detected interest points and each of said at least one virtual interest point has a well-defined position in an image space of said image.

8. The method of claim 7, wherein said procedure of producing said interest point density map is performed according to the number of said detected interest points positioned in a predetermined area surrounding each of the pixels of said image.

9. The method of claim 7, wherein said procedure of producing said interest point density map is performed according to the distance between each of said detected interest points and five of said detected interest points, which are positioned nearest to said detected interest point.

10. The method of claim 7, wherein the position of said virtual interest point is determined according to at least one of the list consisting of: the position of at least one of said detected interest points; the dominant orientation of at least one of said detected interest points; the local scale value of at least one of said detected interest points; and features of said image.

11. The method of claim 7, wherein the characteristics of each of said virtual interest points are determined according to at least the characteristics of at least one of said detected interest points.

12. The method of claim 7, further comprising the procedure of extracting a local descriptor corresponding to each of said detected interest points and a local descriptor corresponding to each of said virtual interest points by a local descriptor extractor implemented by a third processor.

13. The method of claim 7, wherein said first processor and said second processor are a same processor.

* * * * *